(12) United States Patent
Kawanishi et al.

(10) Patent No.: US 6,404,966 B1
(45) Date of Patent: Jun. 11, 2002

(54) OPTICAL FIBER

(75) Inventors: Satoki Kawanishi; Katsunari Okamoto, both of Tokyo (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 09/306,498

(22) Filed: May 6, 1999

(30) Foreign Application Priority Data

May 15, 1998 (JP) .......................... 10-132825
May 7, 1999 (JP) .......................... 10-124345

(51) Int. Cl.[7] .............................. G02B 6/02; G02B 6/34
(52) U.S. Cl. ......................... 385/125; 385/123; 385/37
(58) Field of Search ................................ 385/123–128, 385/37

(56) References Cited

U.S. PATENT DOCUMENTS 5,784,400 A    7/1998  Joannopoulos et al. ....... 372/96

FOREIGN PATENT DOCUMENTS

| JP | 5-33101 | 4/1993 |
|----|---------|--------|
| JP | 5-188225 | 7/1993 |
| JP | 10-95628 | 4/1998 |
| JP | 11-218627 | 8/1999 |
| WO | WO 97/04340 | 2/1997 |
| WO | WO 99/00685 | 1/1999 |
| WO | WO 99/64903 | 12/1999 |
| WO | WO 99/64904 | 12/1999 |

OTHER PUBLICATIONS

Barkou et al., Silica–air photonic crystal fiber design that permits waveguiding by a true photonic bandgap effect, Optical Letters, Printed Jan. 1, 1999, 24:46–48.
Knight et al., Properties of phontonic crystal fiber and the effective index model, J. Opt. Soc. Am. A, Printed Mar. 1998, 15:748–752.
Knight et al., All–silica single–mode optical fiber with photonic crystal cladding, Optical Letters, Printed Oct. 1, 1996, 21: 1547–1549.
Birks et al., Full 2–D photonic bandgaps in silica/air structures, Electronic Letters, Printed Oct. 26, 1995, 31:1941–1943.
Birks et al., "Endlessly single–mode photonic crystal fiber," Optics Letters, vol. 22, No. 13, pp. 961–963 (1997).
Birks et al., "Single–Mode photonic crystal fiber with an indefinitely large core," Technical Digest of the 1998 Conference on Lasers and Electro–optics, CWE4, pp. 226–227.
Joannopoulos et al., "Molding the Flow of Light," in Photonic Crystals, pp. 122–126 (1995).

*Primary Examiner*—Robert H. Kim
*Assistant Examiner*—Amanda Merlino
(74) *Attorney, Agent, or Firm*—Fitch, Even, Tabin & Flannery

(57) ABSTRACT

An optical fiber including a core having an area of about several times an optical wavelength and composed of a hollow hole, and a cladding having a diffraction grating which is arranged at least in a peripheral area adjacent to the core and has a grating period equal to ½ the optical wavelength.

32 Claims, 9 Drawing Sheets

OPTICAL FIBER

This application is based on Patent Application Nos. 124345/1998 filed on May 7, 1998 in Japan, and 132825/1998 filed on May 15, 1998, the content of which is incorporated hereinto by reference.

BACKGROUND OF THE INVENTION

1. Field of the Invention

The present invention relates to an optical fiber, more specifically to a transmission medium used in optical communication networks and optical signal processing.

2. Description of the Prior Art/Related Art

FIG. 1 is a sectional diagram showing the construction of a prior art optical fiber. In FIG. 1, numeral 11 denotes a core, 12 is a cladding, and 13 is a jacket.

FIG. 2 shows a refractive index profile of the prior art optical fiber shown in FIG. 1. Numerals 2a', 2b', and 2c represent diameters of the core, cladding, and jacket, respectively, of which typical values of practical fibers are 4 μm, 15.9 μm, and 125 μm, respectively.

Δn2 and Δn3 represent a refractive index difference between the core 11 and the jacket 13 and a refractive index difference between the cladding 12 and the jacket 13, respectively, of which typical values of both are 0.75% and 0.11%, respectively.

Prior art optical communication fibers are composed mainly of quartz glass both for the core and cladding, and a dopant material such as $GeO_2$ or $P_2O_5$ is added to the quarts glass of the core to increase the refractive index of the core, so that the optical power is concentrated on the core part for propagating the light in the optical fiber.

In the prior art optical fiber, since the refractive index of the core 11 of the fiber is higher than that of the cladding 12, light incident to the optical fiber is confined in the core 11 of the fiber due to the refractive index difference and propagates in the optical fiber. For achieving the confinement of light by the refractive index difference, to satisfy the single mode condition of propagating light, the core diameter is as small as about 4 m. However, in association with the advance of the optical communication networks and optical signal processing, it is required to provide a high capacity optical fiber.

T. A. Birks, et al, in "Endlessly single-mode photonic crystal fiber", Optics Letters, vol. 22, No. 13, pp. 961–963, 1997 and "Single-mode photonic crystal fiber with an indefinitely large core", Technical Digest of the 1998 Conference on Lasers and Electro-optics, CWE4, pp. 226–227, disclose an optical fiber made of quartz glass having a core part without hollow hole and a cladding part having hexagonal arranged hollow holes. According to the literature, although the core diameter is larger than that of the prior art optical fiber, single-mode characteristics can be maintained. Also in this optical fiber, the refractive index of the cladding is smaller than that of the core, and light is therefore confined by total internal reflection as in the prior art optical fiber having no hollow hole.

When short optical pulses or high-power optical signals are propagated in such a prior art optical fiber, there are various disadvantages due to the core made of quartz glass. That is, due to absorption and scattering by impurities in the quartz glass, and nonlinear optical effects of quartz glass when the peak power of the optical signal confined in the core exceeds about 10 mW, spectrum width of the optical signal is increased by a self-phase modulation effect, and incident power is limited by Brillouin Scattering. As a result, deformation of optical waveform and saturation of incident power to the optical fiber occurs. Accordingly, transmission characteristics of optical signals propagating through the optical fiber is degraded. At present, since, even a lowest-loss optical fiber has a loss of about 0.2 dB/km, development is in demand for an optical fiber of even smaller optical loss.

On the other hand, there is known a multidimensional periodic structural body having optical propagation characteristics basically affected by frequency or polarization direction, that is, a so-called photonic crystal. J. D. Joannopoulous, et al. disclose the lattice structure of the photonic crystal in "Photonic Crystals", Princeton University Press, pp. 122–126, 1995, and disclose a resonant cavity utilizing a photonic band gap in U.S. Pat. No. 5,784,400. Further, Ulrike Gruning, et al. disclose an optical structure using photonic band gap in W097/04340.

However, there are no literatures which disclose an optical fiber having a structure which does not depend on the refractive index of a core and comprises a cladding having a photonic band gap.

SUMMARY OF THE INVENTION

Under such circumstances, an object of the present invention is to provide an optical fiber which is not affected by nonlinear optical phenomena or material dispersion, therefore has a significant effect in transmission of high-speed and high-power light waves.

In the first aspect of the present invention, an optical fiber comprises a core having an area of several times an optical wavelength, and a cladding disposed around the core in which a diffraction grating is arranged at least in a peripheral area adjacent to the core and has a grating period (interval) equal to ½ the optical wavelength, namely photonic band gap structure.

In the second aspect of the present invention, an optical fiber comprises a hollow core having an area of several times an optical wavelength, and a cladding disposed around the core in which a diffraction grating is arranged at least in a peripheral area adjacent to the core and has a grating period equal to ½ the optical wavelength.

In the third aspect of the present invention, an optical fiber comprises a core having an area of several times an optical wavelength, and a cladding disposed around the core in which a diffraction grating is arranged at least in a peripheral area adjacent to the core and has a grating period equal to ½ the optical wavelength, wherein the core and the cladding medium are equal in refractive index, and the diffraction grating in the cladding has a grating structure in which a material of a high refractive index is embedded in a medium of a low refractive index.

In the present invention, the core has an area of about several times the optical wavelength, preferably of 10 to 50 microns. By setting the area of the core to about several times the optical wavelength, the allowable incident optical power of the optical fiber can be increased.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 3:
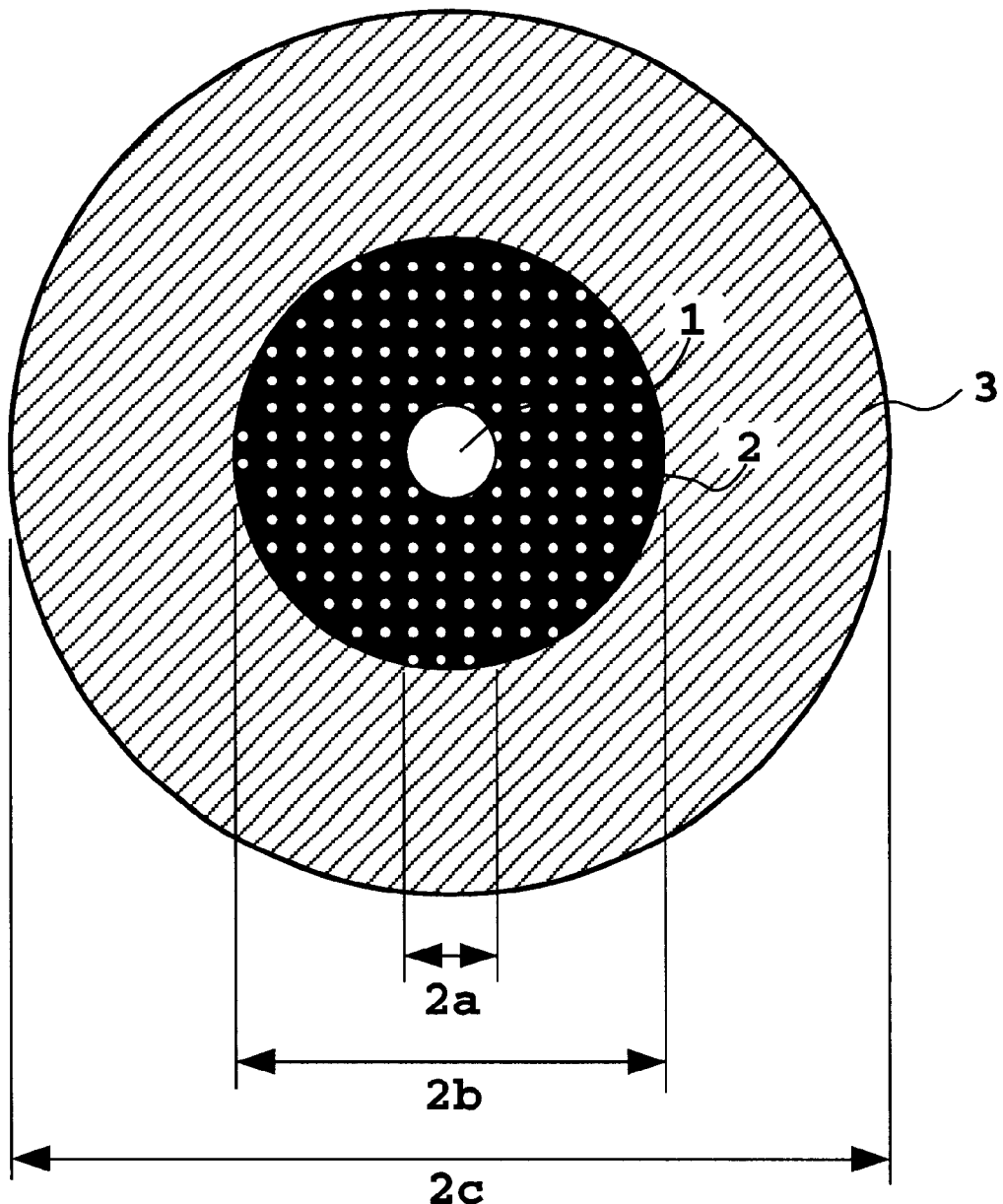
FIG. 3 is a sectional diagram showing an embodiment of the optical fiber according to the present invention.

The optical fiber according to the present embodiment is shown in FIG. 3. In FIG. 3, a core 1 is a hollow hole which is filled in with air. The core 1 is the lowest in refractive index when it is a hollow hole, the refractive index thereof is equal to that of the air, which is about 1. The core constructed of a hollow hole is most preferable since it has no light scattering factor. Numeral 2 indicates a cladding. The cladding 2 has a photonic band gap structure having a diffraction grating formed by arranging hollow holes in a matrix form. Numeral 3 indicates a jacket arranged on the outer periphery of the cladding.

The optical fiber of the present embodiment has not a light scattering factor because the core 1 is hollowed where the signal light energy is most concentrated. Therefore, the optical fiber according to the present embodiment can be expected to have a loss characteristic of about 0.01 dB/km which is far smaller than the prior art optical fiber having a core made of quartz glass.

As shown in FIG. 3, the optical fiber according to the present invention has a grating-formed structure in the sectional direction, and the same structure is maintained in the longitudinal direction. That is, in the three-dimensional photonic band gap, holes in the form of grating are not distributed three-dimensionally, but exist uniformly in the longitudinal direction. Therefore, the cross section of this optical fiber is the same in structure at all places when neglecting a fluctuation of shape due to fabrication process of the optical fiber, and there is no structure perpendicular or diagonal to the longitudinal direction of the optical fiber. That is, the holes in the form of grating which exist in the photonic band gap cladding 2 of FIG. 3 are continuously extended in the longitudinal direction, so that the same sectional surface is obtained even when the fiber is cut at any place in the longitudinal direction.

Figure 1:
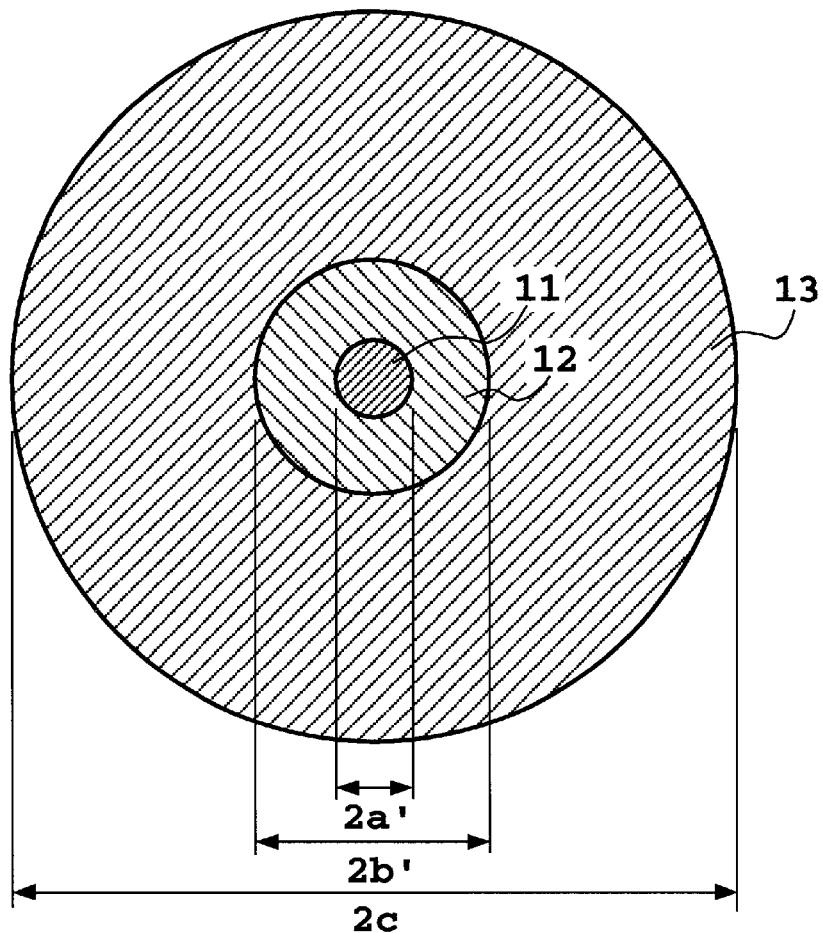
FIG. 1 is a sectional diagram showing a prior art optical fiber.
Figure 2:
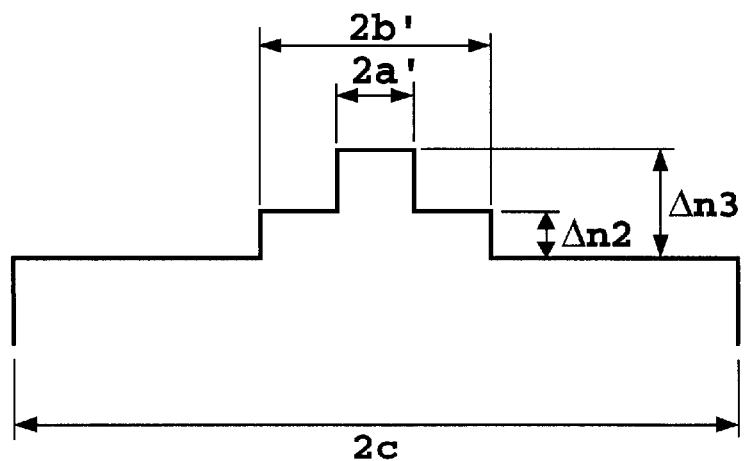
FIG. 2 is a refractive index profile of the optical fiber shown in FIG. 1.

In the prior art optical fiber shown in FIG. 1, since the core 11 is higher in refractive index than the cladding 12 (refractive index difference: $\Delta n3-\Delta n2$) and light is relatively strongly confined in the core part, if only the core diameter $2a'$ of the core 11 is simply increased, the single mode condition in the core 11 becomes unsatisfied.

The fundamental mode in the optical fiber is $HE_{11}$ mode, however, as the core diameter $2a'$ is increased, it becomes a so-called multimode fiber where a higher order mode such as $HE_{12}$ or $HE_{21}$ mode is generated to exist a plurality modes in the core 11, resulting in degradation of transmission characteristics.

When the refractive index of the core 11 is simply made lower than the refractive index of the cladding 12, light energy cannot be confined in the core 1.

Then, in the present invention, the cladding 2 has a diffraction grating which has a grating period equal to ½ the optical wavelength and is arranged at least in the peripheral area adjacent to the core. That is, a photonic band gap structure is arranged over a diameter $2b$ at least in the peripheral area adjacent to the core 1 within the cladding 2. The photonic band gap structure may be arranged in the entire area of the cladding 2. The cladding 2 can be made of a conventional material for the cladding such as quartz glass.

Figure 4:
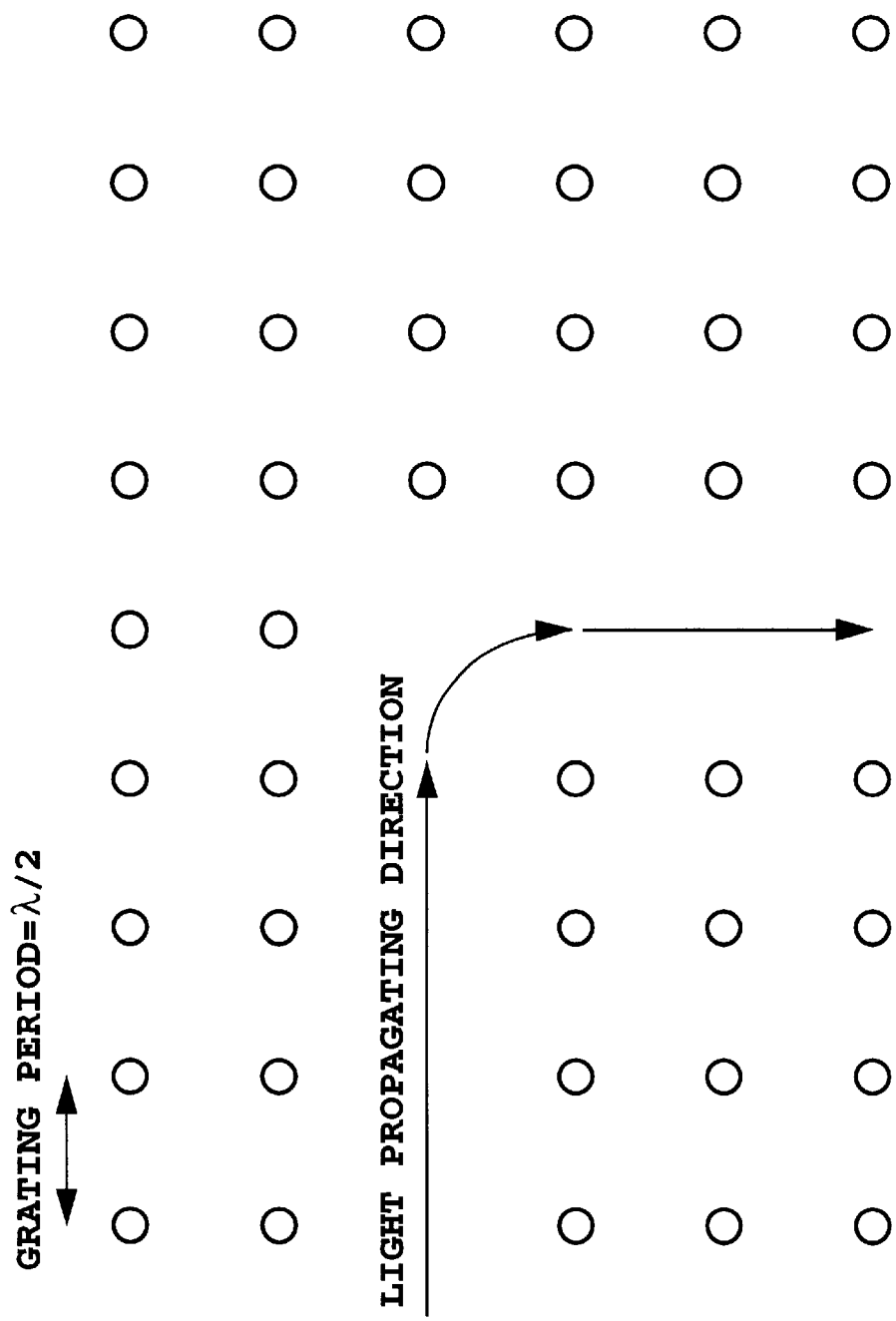
FIG. 4 is a sectional diagram showing the structure of photonic band gap.

FIG. 4 is a diagram showing the structure of the photonic band gap. In general, a three-dimensional photonic band gap structure means a diffraction grating for making Bragg reflection of light in all directions, which is realized by setting the grating period of a diffraction grating to ½ the optical wavelength in the propagating medium as shown in FIG. 4.

As shown in FIG. 3, when the photonic band gap structure is arranged over a diameter $2b$ on the periphery of the core 1, light can be propagated while being confined so that light does not propagate in the radial direction from the center of the core 1 of the optical fiber.

According to the present invention, since light is confined selectively for a wavelength by Bragg reflection of the diffraction grating forming the photonic band gap, instead of total internal reflection. Therefore, suppression of higher order mode is possible more effectively than in the prior art, so that the single mode condition can be maintained when the core diameter is increased.

The jacket may have any value of refractive index. The jacket can be made of a conventional material for the jacket.

Figure 5:
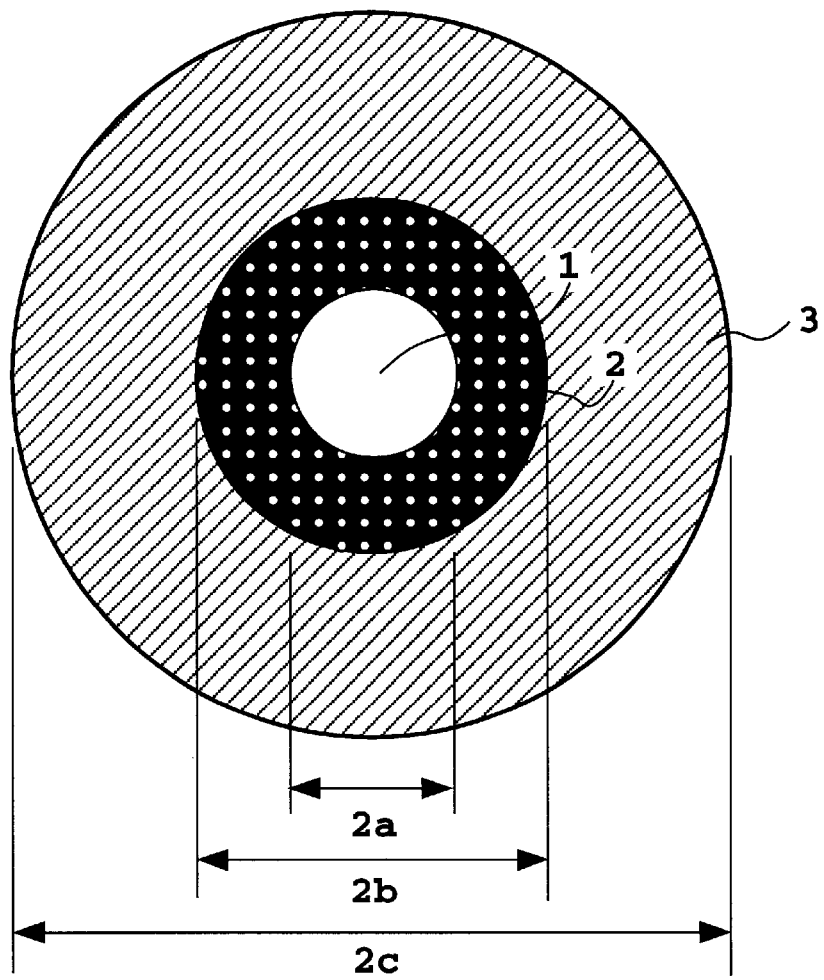
FIGS. 5 and 7 are sectional diagrams showing other two embodiments of optical fiber according to the present invention.
Figure 6:
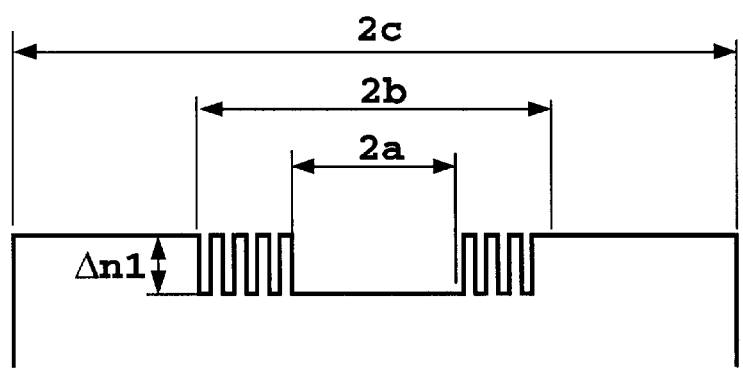
FIGS. 6 and 8 are refractive index profiles of the optical fibers shown respectively in FIGS. 5 and 7.

FIGS. 5 and 6 show a second embodiment of the present invention.

As shown in FIG. 6, the core diameter $2a$ of the core 1 is set larger than the core diameter $2a'$ of the prior art fiber, to about several times the optical wavelength. The cladding 2 has a photonic band gap structure having a diffraction grating formed by arranging hollow holes in a matrix form. The refractive index of the medium of the cladding 2 is set higher than the refractive index of the grating part of the diffraction grating of the photonic crystal in the cladding 2, and a refractive index difference between them is represented as $\Delta n1$. Numeral 3 indicates a jacket with a diameter $2c$ arranged outside the cladding 2.

The core 1 can be made of a conventional material for the core such as quartz glass, and a refractive index of the core can be decreased by about 0.5% by adding fluorine to the core 1.

The core 1 is the lowest in refractive index when it is a hollow hole. The refractive index thereof is equal to that of air, which is substantially 1. The core comprising a hollow hole is most preferable because it has no light scattering factor.

As in the first embodiment, the photonic band gap structure may be arranged in the entire area of the cladding 2. The cladding 2 can be made of a conventional material for the cladding such as quartz glass. The jacket may have any value of refractive index. The jacket can be made of a conventional material for the jacket.

The optical fiber according to the present embodiment was single mode and had an increased allowable incident optical power.

Figure 7:
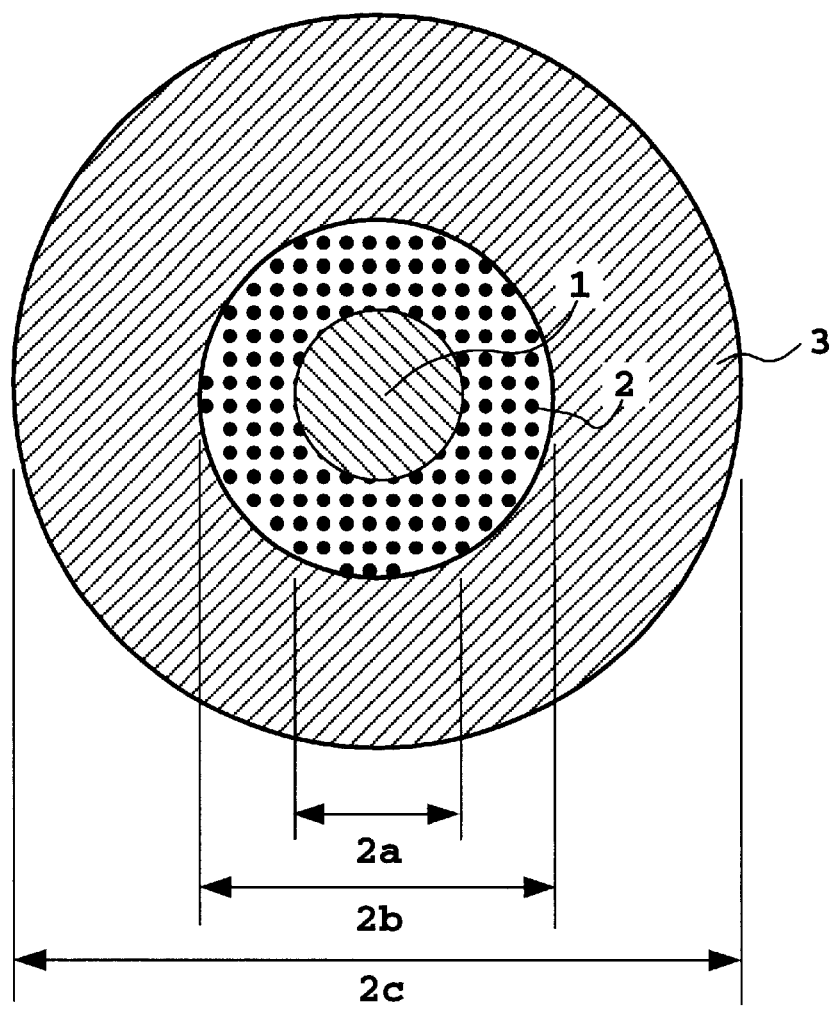
Figure 8:
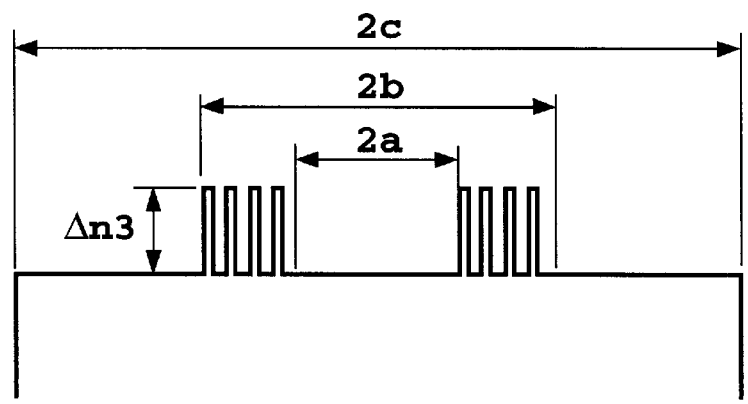

FIGS. 7 and 8 show a third embodiment of the present invention.

As shown in FIGS. 7 and 8, the core 1 and the cladding 2 medium had the same refractive indices, that is, were made of the same material. The grating part of the diffraction grating of the photonic crystal in the cladding 2 was not composed of hollow holes, but a material of higher refractive index by Δn3 is embedded in a medium forming the cladding, in the form of a grating structure.

This makes it possible to realize the photonic band gap structure from refractive index difference of Δn3.

A jacket was arranged around the cladding 2. It may have any value of refractive index and can be made of the conventional material.

The optical fiber of the present embodiment was also single mode and had an increased allowable incident optical power.

According to the present invention, since the grating forming the photonic band gap is filled with a material which is higher in refractive index than the ambience, rather tha hollow holes, it has advantages that the mechanical strength of the entire fiber is increased and it is easier to maintain the grating shape in the process for drawing the fiber from the preform, as compared with the case of hollow holes.

The diffraction grating in the photonic crystal forming the photonic band gap is not specifically limited if it is a grating structure which is capable of confining light in the core 1 so that light does not propagate in the radial direction from the center of the core 1 of the optical fiber.

Figure 9:
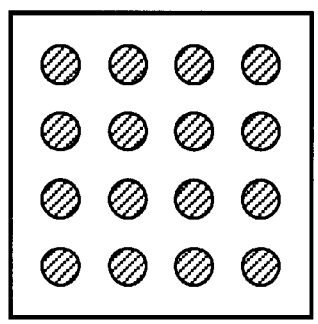
FIGS. 9 to 13 are sectional diagrams showing various examples of arrangement form of diffraction grating.

FIG. 9 shows a grating structure in which a high refractive index material is arranged in a matrix form and embedded in a low refractive index medium.

Figure 10:
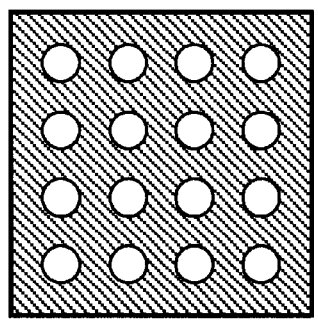

FIG. 10 shows a grating structure in which a low refractive index material is arranged in a matrix form and embedded in a high refractive index medium.

Figure 11:
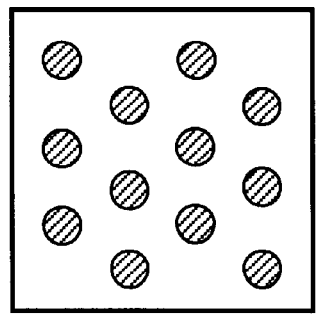

FIG. 11 shows a grating structure in which a high refractive index material is arranged in a triangular form and embedded in a low refractive index medium.

Figure 12:
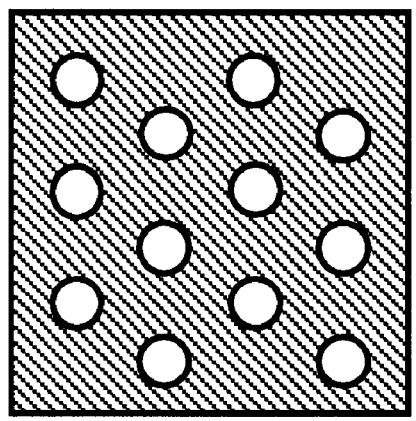

FIG. 12 shows a grating structure in which a low refractive index material is arranged in a triangular form and embedded in a high refractive index medium.

Figure 13:
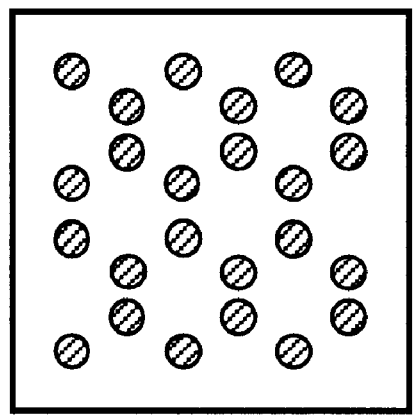

FIG. 13 shows a grating structure in which a high refractive index material is arranged in a honeycomb form and embedded in a low refractive index medium.

When quartz glass is used as the material of the optical fiber, the refractive index can be increased or decreased by the following methods.

1) To increase the refractive index: $GeO_2$ is added to quarts glass (refractive index difference 0.33 to 2%) or $P_2O_5$ is added to quartz glass (refractive index difference: 0.33 to 1%).

2) To decrease the refractive index: F (fluorine) is added to quartz glass (refractive index difference 0.5%) or a hollow hole is formed (refractive index difference 44%).

Therefore, the photonic band gap grating can be constructed by a combination of two of these three options including the above increasing and decreasing methods 1) and 2) and pure quartz glass.

Further, the grating shape is not limited to columnar (circular hole), but may be of a triangular pillar (triangular hole), square pillar (square hole), hexagonal pillar (hexagonal hole), or the like, and any form is possible to realize the photonic band gap.

When a high refractive index material is embedded in a low refractive index medium to construct a diffraction grating, the refractive index of the core may be equal to the refractive index of the cladding medium.

In the optical fiber according to the present invention, a jacket may be further provided on the outside of the cladding, however, if the cladding of the photonic band gap structure has a sufficient strength for protecting the core, the jacket is not specifically required. The thickness of the cladding itself of the photonic band gap structure may be increased to have a sufficient strength. When such a structure is employed, all parts of the fiber other than the core form the photonic band gap structure.

Figure 14:
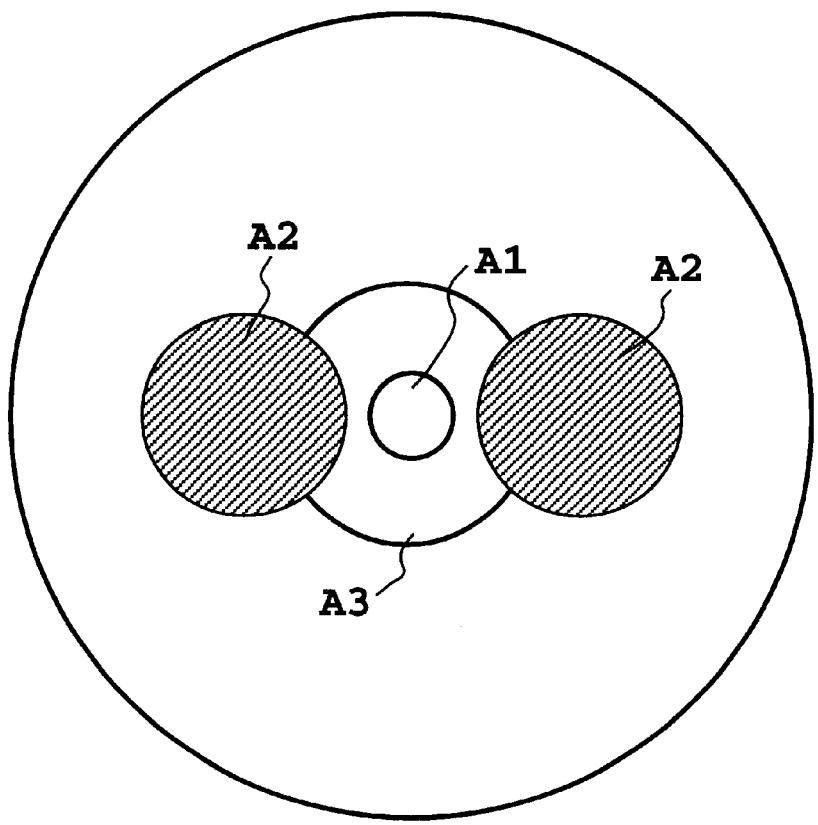
FIG. 14 is a sectional diagram showing the structure of a polarization maintaining fiber.

The optical fiber according to the present invention can be fabricated by applying the prior art polarization maintaining fiber fabrication technology. FIG. 14 shows the structure of a polarization maintaining fiber. In FIG. 14, reference numeral A1 indicates a core, A2 is a stress applying part, and A3 is a cladding. First, hollow holes are previously formed in parts corresponding to the stress applying parts A2 of an optical fiber preform before fiber drawing. Then the hollow hole parts are filled with a material for stress application, and thereafter the preform can be drawn to fabricate a polarization maintaining fiber.

The cladding of the photonic band gap structure can be fabricated using the same technique as the polarization maintaining fiber fabrication technology. In the present invention, the fiber drawing is performed while leaving the hollow holes formed in the parts corresponding to the photonic band gap in the stage of preform.

Figure 15:
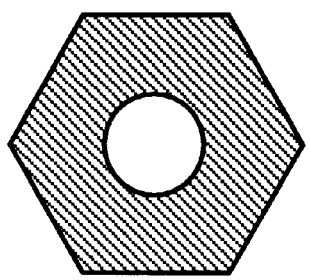
FIG. 15 is a sectional diagram of a hexagonally formed glass rod used in the fabrication of the optical fiber according to the present invention, of which a central part is a hollow hole or filled with a material having a different refractive index.
Figure 16:
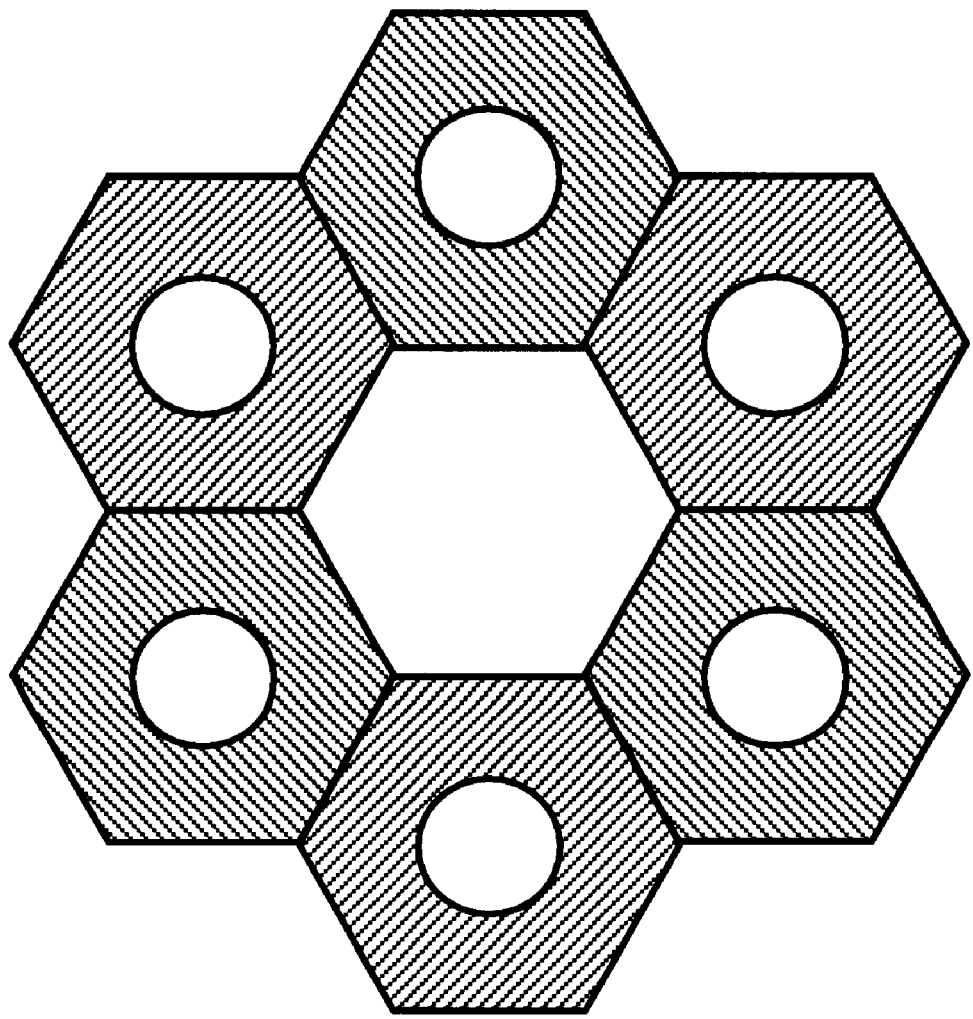
FIG. 16 is a sectional diagram of a plurality of hexagonally formed glass rods bundled in a honeycomb form.

As an alternative fabrication method, fabrication is carried out using a plurality of hexagonally formed glass rods. First, as shown in FIG. 15, a hexagonally formed glass rod is prepared which has a central part of hollow hole or filled with a material of different refractive index, then a plurality of the glass rods are bundled as shown in FIG. 16 to form a cross section just like a honeycomb. Next, the honeycomb formed glass rod bundle can be drawn to fabricate the optical fiber of the present invention.

The present invention has been described in detail with respect to preferred embodiments, and it will now be that changes and modifications may be made without departing from the invention in its broader aspects, and it is the intention, therefore, in the appended claims to cover all such changes and modifications as fall within the true spirit of the invention.

What is claimed is:

1. A single mode optical fiber comprising:
   a core having an area of several times an optical wavelength; and
   a cladding disposed around said core in which a diffraction grating is arranged at least in a peripheral area adjacent to said core and forms a photonic band gap;
   wherein the refractive index of said core is lower than that of said cladding.

2. The single mode optical fiber as claimed in claim 1, wherein said diffraction grating in said cladding comprises a grating structure in which a high refractive index material is embedded in a low refractive index medium.

3. The single mode optical fiber as claimed in claim 1, where said diffraction grating in said cladding comprises a grating structure in which a low refractive index material is embedded in a high refractive index medium.

4. An optical fiber comprising:
a hollow core having an area of several times an optical wavelength; and
a cladding disposed around said core in which a diffraction grating is arranged at least in a peripheral area adjacent to said core and has a grating period equal to ½ the optical wavelength.

5. The optical fiber as claimed in claim 4, wherein said diffraction grating in said cladding comprises a grating structure in which a high refractive index material is embedded in a low refractive index medium.

6. The optical fiber as claimed in claim 4, wherein said diffraction grating in said cladding comprises a grating structure in which a low refractive index material is embedded in a high refractive index medium.

7. An optical fiber comprising:
a core having an area of several times an optical wavelength; and
a cladding disposed around said core in which a diffraction grating is arranged at least in a peripheral area adjacent to said core and has a grating period equal to ½ the optical wavelength,
wherein said core and said cladding medium are equal in refractive index, and said diffraction grating in said cladding is constructed by a grating structure in which a high refractive index material is embedded in a low refractive index medium.

8. The single mode optical fiber as claimed in claim 1, wherein said diffraction grating comprises a grating structure arranged in the form of a matrix.

9. The single mode optical fiber as claimed in claim 1, wherein said diffraction grating comprises a grating structure arranged in the form of a triangle.

10. The single mode optical fiber as claimed in claim 1, wherein said diffraction grating comprises a grating structure arranged in the form of a honeycomb.

11. The single mode optical fiber as claimed in claim 1, wherein said diffraction grating comprises a grating structure arranged in the form of a matrix, and has a grating of a columnar or circular hole shape.

12. The single mode optical fiber as claimed in claim 1, wherein said diffraction grating comprises a grating structure arranged in the form of a triangle, and has a grating of a columnar or circular hole shape.

13. The single mode optical fiber as claimed in claim 1, wherein said diffraction grating comprises a grating structure arranged in the form of a honeycomb form, and has a grating of a columnar or circular hole shape.

14. The single mode optical fiber as claimed in claim 1, wherein the cladding has an entire area and the entire area of said cladding comprises a diffraction grating forming said photonic band gap.

15. The optical fiber as claimed in claim 7, wherein said grating structure is arranged in the form of a matrix.

16. The optical fiber as claimed in claim 7, wherein said grating structure is arranged in the form of a triangle.

17. The optical fiber as claimed in claim 7, wherein said grating structure is arranged in the form of a honeycomb.

18. The optical fiber as claimed in claim 7, wherein said grating structure is arranged in the form of a matrix, and has a grating of a columnar or circular hole shape.

19. The optical fiber as claimed in claim 7, wherein said grating structure is arranged in the form of a triangle, and has a grating of a columnar or circular hole shape.

20. The optical fiber as claimed in claim 7, wherein said grating structure is arranged in the form of a honeycomb form, and has a grating of a columnar or circular hole shape.

21. The optical fiber as claimed in claim 7, wherein the entire area of said cladding comprises a diffraction grating having a grating period equal to ½ the optical wavelength.

22. A single mode optical fiber comprising:
a hollow core having an area of several times an optical wavelength; and
a cladding disposed around said core in which a diffraction grating is arranged at least in a peripheral area adjacent to said core and forms a photonic band gap.

23. The single mode optical fiber as claimed in claim 22, wherein said diffraction grating in said cladding comprises a grating structure in which a high refractive index material is embedded in a low refractive index medium.

24. The single mode optical fiber as claimed in claim 22, wherein said diffraction grating in said cladding comprises a grating structure in which a low refractive index material is embedded in a high refractive index medium.

25. A single mode optical fiber comprising:
a core having an area of several times an optical wavelength; and
a cladding disposed around said core in which a diffraction grating is arranged at least in a peripheral area adjacent to said core and forms a photonic band gap;
wherein said core and said cladding medium are equal in refractive index, and said diffraction grating in said cladding is constructed by a grating structure in which a high refractive index material is embedded in a low refractive index medium.

26. The single mode optical fiber as claimed in claim 25, wherein said grating structure is arranged in the form of a matrix.

27. The single mode optical fiber as claimed in claim 25, wherein said grating structure is arranged in the form of a triangle.

28. The single mode optical fiber as claimed in claim 25, wherein said grating structure is arranged in the form of a honeycomb.

29. The single mode optical fiber as claimed in claim 25, wherein said grating structure is arranged in the form of a matrix, and has a grating of a columnar or circular hole shape.

30. The single mode optical fiber as claimed in claim 25, wherein said grating structure is arranged in the form of a triangle, and has a grating of a columnar or circular hole shape.

31. The single mode optical fiber as claimed in claim 25, wherein said grating structure is arranged in the form of a honeycomb form, and has a grating of a columnar or circular hole shape.

32. The single mode optical fiber as claimed in claim 25, wherein the cladding has an entire area and the entire area of said cladding comprises said diffraction grating forming said photonic band gap.

\* \* \* \* \*